US008831807B2

United States Patent
Dehmann

(10) Patent No.: US 8,831,807 B2
(45) Date of Patent: Sep. 9, 2014

(54) METHOD AND DEVICE FOR OPERATING A USER INTERFACE FOR DISPLAYING THE TRAVEL RANGE OF A VEHICLE

(75) Inventor: Rainer Dehmann, Berlin (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/394,316

(22) PCT Filed: Sep. 3, 2010

(86) PCT No.: PCT/EP2010/005401
§ 371 (c)(1),
(2), (4) Date: May 2, 2012

(87) PCT Pub. No.: WO2011/026625
PCT Pub. Date: Mar. 10, 2011

(65) Prior Publication Data
US 2012/0209465 A1    Aug. 16, 2012

(30) Foreign Application Priority Data

Sep. 4, 2009 (DE) .......................... 10 2009 040 268
Jun. 4, 2010 (DE) .......................... 10 2010 022 719

(51) Int. Cl.
*B60W 10/24* (2006.01)

(52) U.S. Cl.
CPC .................................... *B60W 10/24* (2013.01)
USPC ................................ 701/22; 701/81; 701/527

(58) Field of Classification Search
CPC ....... B60L 9/00; B60L 11/00; B60L 2250/00; B60L 2250/16; B60L 2260/54; B60L 3/00; B60L 3/0046; B60K 25/00; B60K 25/08; B60K 1/00; B60K 6/20; B60K 6/448; B60T 7/16; B62D 61/06; B62D 5/00; B62D 7/00
USPC .......... 701/22, 81, 225, 527; 180/53.5, 53.62, 180/60, 65.1, 65.21, 65.24, 65.31, 65.6, 180/65.8, 167, 214, 216, 220, 242, 279, 180/407, 412–413, 415, 422, 443
See application file for complete search history.

(56) References Cited

U.S. PATENT DOCUMENTS 5,686,895 A    11/1997   Nakai et al.
5,916,298 A  *  6/1999   Kroiss et al. ................... 701/123

(Continued)

FOREIGN PATENT DOCUMENTS

DE          10138750 A1  *  2/2003
DE          101 38 750        2/2004

(Continued)

OTHER PUBLICATIONS

International Preliminary Report on Patentability and Written Opinion, issued in corresponding International Application No. PCT/EP2010/005401.

(Continued)

*Primary Examiner* — Mary Cheung
*Assistant Examiner* — Atul Trivedi
(74) *Attorney, Agent, or Firm* — Kenyon & Kenyon LLP

(57) ABSTRACT

In a method and a device for operating a user interface in a vehicle, in particular for determining and displaying information in connection with electrical consumers, an operator action is detected, by which the operation of an electrical consumer disposed in the vehicle is modified, and a change in the energy consumption of the electrical consumer caused by the operator action is determined. Using the determined energy consumption, a change in the travel range of the vehicle caused by the modified operation of the electrical consumer is calculated, and the calculated change in travel range is displayed directly. The method and the device are especially suitable for a vehicle driven by an electric motor.

9 Claims, 3 Drawing Sheets

(56) References Cited

U.S. PATENT DOCUMENTS

| | | | |
|---|---|---|---|
| 6,116,363 A * | 9/2000 | Frank | 180/65.25 |
| 6,331,762 B1 * | 12/2001 | Bertness | 320/134 |
| 6,625,539 B1 * | 9/2003 | Kittell et al. | 701/29.3 |
| 6,826,460 B2 * | 11/2004 | Kittell et al. | 701/22 |
| 7,617,894 B2 * | 11/2009 | Ozeki et al. | 180/65.21 |
| 8,417,401 B2 * | 4/2013 | Takahara et al. | 701/22 |
| 2003/0144779 A1 * | 7/2003 | Obayashi et al. | 701/36 |
| 2006/0100754 A1 * | 5/2006 | Wobben | 701/22 |
| 2007/0000247 A1 * | 1/2007 | Perkins | 60/565 |
| 2007/0100512 A1 * | 5/2007 | Funk | 701/1 |
| 2007/0173983 A1 * | 7/2007 | Takahashi et al. | 701/1 |
| 2007/0176762 A1 * | 8/2007 | Aoyagi et al. | 340/439 |
| 2007/0271026 A1 * | 11/2007 | Hijikata | 701/103 |
| 2009/0105926 A1 * | 4/2009 | Choi | 701/102 |
| 2009/0143929 A1 * | 6/2009 | Eberhard et al. | 701/22 |
| 2009/0217685 A1 * | 9/2009 | Mola et al. | 62/157 |
| 2009/0234528 A1 * | 9/2009 | Crombez | 701/29 |
| 2009/0321163 A1 * | 12/2009 | Suzui | 180/65.265 |
| 2009/0326753 A1 * | 12/2009 | Chen et al. | 701/29 |
| 2010/0057280 A1 * | 3/2010 | Crowe et al. | 701/22 |
| 2010/0106352 A1 * | 4/2010 | Skaff et al. | 701/22 |
| 2010/0205137 A1 * | 8/2010 | Barsness et al. | 706/52 |
| 2010/0235024 A1 * | 9/2010 | Uchida | 701/22 |
| 2010/0262566 A1 * | 10/2010 | Yamamoto | 705/412 |
| 2010/0286830 A1 * | 11/2010 | Wijaya et al. | 700/276 |
| 2011/0022262 A1 * | 1/2011 | Fennel et al. | 701/33 |
| 2011/0082594 A1 * | 4/2011 | Dage et al. | 700/278 |
| 2011/0153141 A1 * | 6/2011 | Beechie et al. | 701/29 |
| 2011/0172871 A1 * | 7/2011 | Hall et al. | 701/29 |
| 2012/0010769 A1 * | 1/2012 | Sourioux et al. | 701/22 |
| 2012/0022775 A1 * | 1/2012 | Yamada et al. | 701/123 |
| 2012/0109413 A1 * | 5/2012 | Smith et al. | 701/1 |
| 2012/0116606 A1 * | 5/2012 | Ichinokawa | 701/1 |
| 2012/0179314 A1 * | 7/2012 | Gilman et al. | 701/22 |
| 2012/0179318 A1 * | 7/2012 | Gilman et al. | 701/22 |
| 2012/0179319 A1 * | 7/2012 | Gilman et al. | 701/22 |
| 2013/0073113 A1 * | 3/2013 | Wang et al. | 701/1 |

FOREIGN PATENT DOCUMENTS

| | | | |
|---|---|---|---|
| DE | 10 2007 054 738 | | 5/2009 |
| DE | 10 2008 035 460 | | 5/2009 |
| DE | 102007054738 A1 * | | 5/2009 |
| EP | 2 028 059 | | 2/2009 |
| EP | 2028059 A2 * | | 2/2009 ............. F16H 63/42 |

OTHER PUBLICATIONS

International Search Report, issued in corresponding International Application No. PCT/EP2010/005401.

* cited by examiner

METHOD AND DEVICE FOR OPERATING A USER INTERFACE FOR DISPLAYING THE TRAVEL RANGE OF A VEHICLE

FIELD OF THE INVENTION

The present invention relates to a method and a device for operating a user interface in a vehicle, in particular for the purpose of determining and displaying information in connection with electrical consumers situated in the vehicle. The method and the device are therefore particularly suitable for a vehicle driven by an electric motor.

BACKGROUND INFORMATION

These days, a multitude of electrically supplied supplementary systems is installed in a vehicle. The electrical supply of these supplementary systems, which are also referred to as electrical consumers, is usually implemented via the vehicle battery, which in turn may be supplied or recharged from other energy sources. Apart from infotainment devices, navigation systems or communication systems, in particular, the most common consumers also are air-conditioning systems for controlling the climate inside the vehicle.

The number of electrical consumers is only going to increase in the future. Climate control systems, in particular, are used to an increasing extent in motor vehicles. In view of the rising number and prevalence of such consumers, it will be necessary, in particular, to consider the additionally resulting energy consumption in the overall energy consumption of the vehicle.

This additional energy consumption not only leads to generally increasing costs, but also reduces the travel range of the vehicle. This has a negative effect especially on vehicles that are driven directly by an electric motor. The reason for this is that in the early phase of electromobility, the travel ranges of such vehicles are currently considerably lower than those of vehicles driven by an internal combustion engine. On the other hand, the provision of corresponding charging stations for charging the vehicle battery is still not fully adequate at present. Therefore, it is desirable to provide the driver with very precise information about the expected travel range of the vehicle, and possibly suggest ways in which this travel range is able to be increased.

European Patent Document No. 2 028 059 describes a vehicle having a plurality of connectable or disconnectable systems, whose operation increases the fuel consumption. The energy consumption of the individual systems can be determined and displayed individually, e.g., in liters per hour, liters per 100 km, or as a percentage of an assumed maximum value.

German Patent Document No. 101 38 750 describes a method for displaying energy consumers inside a vehicle. In so doing, the consumption data of different consumers are determined and the individual consumption, as well as the increase in travel range that is achievable by deactivating the consumers, is displayed in the form of a list.

SUMMARY

Example embodiments of the present invention provide a method and a device, with whose aid the user of the vehicle is able to view the effects of the energy consumption of electrical consumers, to increase the vehicle travel range and to save costs by the user's actions.

In the method according to example embodiments of the present invention for operating a user interface in a vehicle, an operator action by which the operation of an electrical consumer disposed in the vehicle is modified, is detected and the change in the energy consumption of the electrical consumer caused by the operator action is determined. Based on the determined energy consumption, a change in travel range of the vehicle resulting from the modification of the electrical consumer's operation is calculated, and the calculated change in travel range is displayed directly. The direct display of the change in travel range resulting from the operator action has the advantage that the user, typically the driver or passenger, receives immediate feedback of the effect of his or her action. In particular, there is no need to first call up a list of the current electrical consumers from a different operation menu.

"Directly" in the present context denotes, for example, a display at the usual technology-related delay times, which are caused, for example, by the process of determining the change in energy consumption, the data processing or the data transmission. The delay lies within a range of a few tenths of a second to seconds, for instance, and the display takes place automatically, without any further operator action on the part of the user. The process of determining the change in energy consumption may specifically consist of a first step of a rough measurement or an estimate, which is refined by a more precise measurement in a second step. This is advantageous in cases in which the measurement of the precise change in the energy consumption requires a period of time that would prevent a direct display. An estimate may use, in particular, comparison measurements that have taken place in the past and were stored in a database. It may also utilize values calculated via interpolation, extrapolation or calculated via a regression analysis.

The operator action by which the operation of an electrical consumer situated inside the vehicle is modified is the activation or run-up of an electrical consumer, in particular.

For example, the driver of the vehicle turns on the car radio or adjusts a climate-control function of the climate-control system to a higher setting by selecting a stronger ventilation flow, for instance. Other operator actions for controlling electrically operated consumers may also be involved, however, such as the deactivation of a consumer. This not only indicates the travel range reduction caused by the activation of a new consumer or by the higher setting of an already activated consumer to the user, but also the increase in travel range in the opposite case. As a result, the user receives immediate system-side feedback as to whether an operator action has an energy-increasing, energy-conserving or energy-neutral effect.

It may optionally also be indicated if an electrical consumer exhibits a drastic change in energy consumption without any operator action. It is indicated, for instance, that a sensor-controlled automatic climate-control system automatically adjusts individual climate-control functions to a higher setting in the course of a hot summer day, or that a mobile telephony device increases the transmission power in the presence of poor reception conditions, whereupon the vehicle driver is alerted to the reduction in travel range resulting therefrom.

The change in travel range is displayed, in particular graphically on a display area in the vehicle. The display area may be part of a so-called instrument cluster, which normally has a number of areas on which different types of information are displayed. Apart from analog indicator display devices such as round mechanical instruments for the analog display of information such as the speed, for example, additional, freely programmable areas may be included in which the change in travel range of the vehicle caused by the electrical consumer is displayable, e.g., as individual message or in graphical form. In conventional manner, liquid crystal displays (LCDs), in particular thin-film transistor (TFT) displays, are used as display area.

As an alternative or in addition, the change in travel range may be displayed on the operator element via which the operator action for modifying the operation of the electrical consumer was detected. Since the user needs to glance, at least briefly, at the individual operator element during the operator action, the effect of the operator action on the change in travel range is thereby visually signaled to the user, directly and in a prominent location, e.g., by a change in color or in the light intensity.

Such an operator element is typically implemented as mechanical push-button, or rotary or toggle switch which has a fixedly assigned function. However, the operator element may also be implemented as a so-called soft key and situated adjacent to the aforementioned display area, and a function which is variably displayable on the display area is assigned to the operator element. It may be provided that a mechanical operator element is able to be illuminated or backlit with the aid of an illumination device, and the reduced range resulting from the operator action may be indicated by, for instance, the activation, an increase in intensity or a color change of the illumination.

As an alternative, the operator element may also be provided in the form of a command button in the display area. A command button in the present context is, for example, a control element of a graphical user interface. A command button may be produced as desired in a freely programmable display area and differs from elements and areas for the pure display of information, so-called display elements or display areas, by being selectable. The command buttons may replace the previously mentioned conventional mechanical switches. When a command button is selected, an assigned function, especially the modification of the operation of an electrical consumer, is executed. Moreover, a command button may be able to be marked. In this case the assigned function is not executed yet. Nevertheless, the marked command button is shown in highlighted form in comparison with other command buttons. In particular, an expected change in travel range is displayed, by a change in color of the command button, for example. The marking and/or selecting of a command button may be implemented by a cursor control or by the direct operation of a touch-sensitive surface of the display area.

In an advantageous manner, the change in travel range expected upon completion of the operator action is able to be calculated and displayed even while the operator action for the modification of the operation of the electrical consumer disposed in the vehicle is taking place. In the process, the user is quickly able to see whether his action possibly has a dramatic effect on the change in travel range and then abort or cancel the operator action immediately, if he believes that an unreasonable reduction in range would result. This action may be concluded in one step, which lowers the risk of a faulty operation or distraction from the traffic situation. In the case of operator actions that would result in a travel range reduction that exceeds a stipulated limit value, it may also be provided that prior to the execution of the corresponding function, a request for user input is first output, the user input requesting the continuation or termination of the operator action.

The method described herein may be especially suitable for vehicles driven by an electric motor, since in the early phase of electromobility, the travel range of electric vehicles is still relatively low in comparison with vehicles equipped with an internal combustion engine, and it is also not yet possible to provide the full range of corresponding charge stations for recharging the vehicle battery. In this manner it is possible to bring the subject of travel range manipulation to the immediate attention of the driver of an electric vehicle.

The electrical consumer is a climate-control system for the interior of the vehicle, in particular. Since climate-control functions usually claim the predominant share of additional electrical energy in the vehicle, it is also beneficial if the set climate-control functions and/or the climate-control functions modified by the operator action, e.g., the ventilation stage or the selected temperature, are graphically displayed on the display area together with the individually associated changes in travel range. This makes it easier to convey to the user which one of the currently selected climate-control functions may be used for manipulating the remaining travel range the most, if appropriate.

The device according to example embodiments of the present invention for operating a user interface in a vehicle is equipped with a device for determining the energy consumption of an electrical consumer situated inside the vehicle; it also includes an operator element by which an operator action via which the operation of the electrical consumer is modifiable is able to be detected, as well as a display device for the display of information. Moreover, the device includes a control unit which is coupled to the device for detecting the energy consumption and to the display device, the display device being controllable by the control unit, and a change in travel range of the vehicle being able to be calculated from the determined energy consumption. The display device may be controllable via the control unit, such that a change in travel range expected during and/or after completing the operator action is directly displayable. In addition, the display device may include an illumination device, which is able to be regulated with regard to the light intensity or color, for illuminating or backlighting the operator element, and/or a display area for displaying the change in travel range. The device is especially suitable for implementing the method described herein. As a result, it likewise provides the advantages of the method described herein.

According to example embodiments of the present invention, a vehicle, especially a vehicle driven by an electric motor, furthermore is equipped with such a device for operating a user interface.

Example embodiments of the present invention are explained in greater detail below with reference to the Figures.

DETAILED DESCRIPTION

Figure 1:
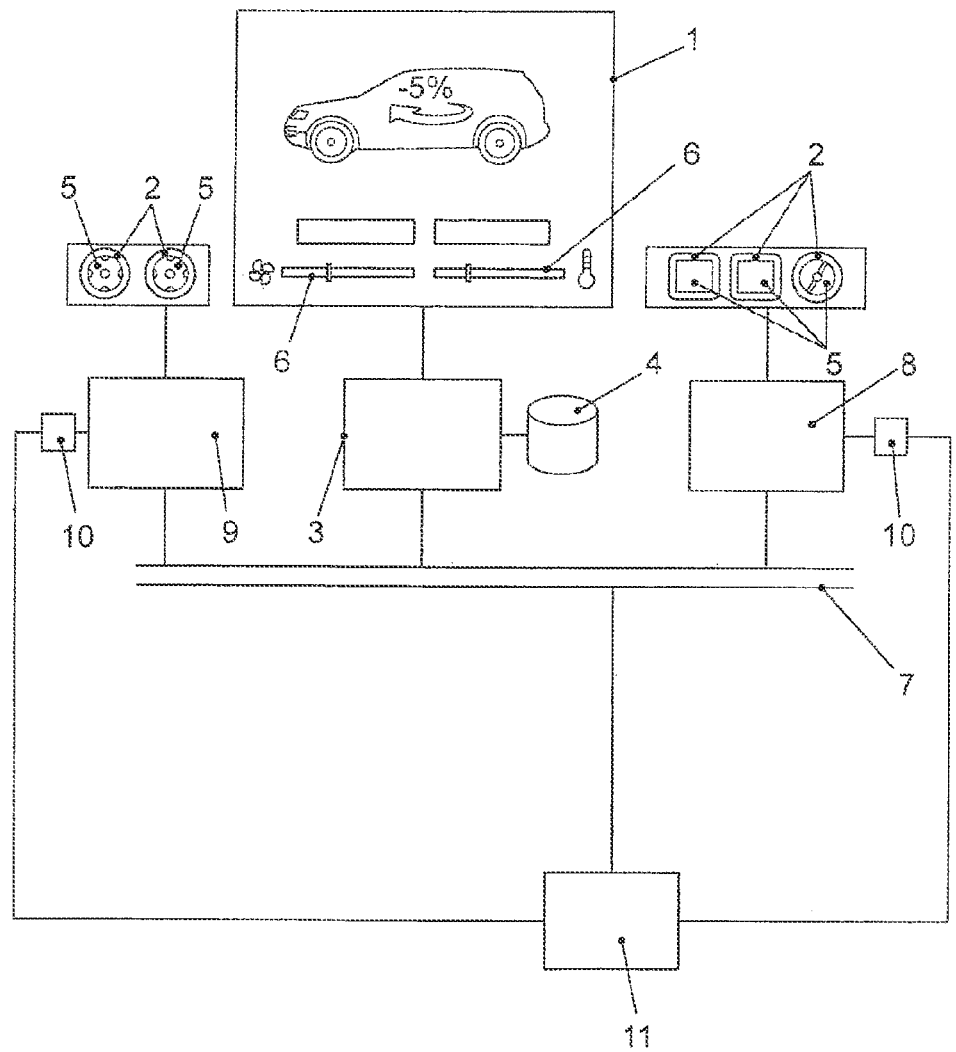
FIG. 1 schematically illustrates the structure of a device for operating a user interface according to an example embodiment of the present invention.

FIG. 1 schematically illustrates the structure of the device for operating a user interface according to an example embodiment of the present invention. A display area 1 having a touch-sensitive surface for the display of information is situated inside a vehicle driven by an electric motor, herein-after also referred to as electric vehicle. Display area 1 is able to be utilized for the display of various types of information and may output, for example, display contents of a navigation system, an infotainment system or other functional devices of the vehicle. These devices are electrical consumers.

In the exemplary embodiment shown, a climate-control system 8 and an additional electrical consumer 9 such as an infotainment system are illustrated as electrical consumers. Their operation is modifiable via assigned operator elements 5. Operator elements 5 may be pushbuttons or rotary buttons in, e.g., a conventional manner, or they may be implemented as multi-directional keys. Operator elements 5 are provided with illumination means 2, with whose aid they are able to be lit or backlit. Illumination device 2 includes LEDs (light emitting diodes), for instance, via which light having at least two different wavelengths such as red and yellow is able to be emitted. Furthermore, command buttons 6 are providable on display area 1, via which a user is able to perform additional operator actions in a context-specific manner.

Electrical consumers 8, 9 are assigned a device 10 for detecting the energy consumption, with whose aid it is possible, in particular, to determine the change in energy consumption as a function of the operation of the individual electrical consumer 8, 9. The energy consumption may typically be determined by conventional power measurement methods. For example, current and voltage values are sampled at regular, consecutive time intervals and the electrical energy or power is derived from their product. In particular, it may be recorded which operator action causes a change in the electrical power required by the individual consumer 8, 9, and in this manner assign a consumption characteristic to specific operating states.

For a data exchange, control unit 3 is coupled, via data bus 7 in the vehicle, to electrical consumers 8, 9 and to device 10, linked thereto, for determining the energy consumption. Moreover, control unit 3 is connected to a data base 4, in which the recorded consumption characteristic of the individual operating states is storable. At a later point in time, the expected change in energy consumption is thus able to be determined even during an operator action, in that, for example, an estimation is performed by the data obtained in the past. Such an estimate may also include a regression analysis, an interpolation or an extrapolation across a multitude of previously recorded operating states.

Furthermore, vehicle battery 11 of the electric vehicle is equipped with a measuring device for measuring the charge state, which is coupled, via data bus 7, to control unit 3 for the exchange of data, so that control unit 3 is able to detect the charge state of vehicle battery 11.

Display area 1 is connected to control unit 3, so that the display contents are controllable by control unit 3. Information pertaining to the change in travel range of the electric vehicle, in particular, is able to be displayed directly on display area 1, as a function of the change in operation of electrical consumers 8, 9. Furthermore, illumination device 2 of operator elements 5 assigned to electrical consumers 8, 9 is coupled to control unit 3 via data bus 7 in the vehicle and controllable by control unit 3 individually. Control unit 3 is able to actuate illumination device 2 using two different colors, and to regulate the illumination intensity.

The method of an example embodiment of the present invention is explained in detail more below with reference to FIGS. 2*a*-2*c*. There, three consecutive phases of an operator action for modifying the operation of climate-control system 8 of the afore-described exemplary embodiment of the device are illustrated, together with the associated displays as they are generated according to the exemplary embodiment of the method. The operator action phases illustrated in FIG. 2*b* and FIG. 2*c*, in particular, are also able to be executed independently of one another and are not conditional upon each other.

Figure 2A:
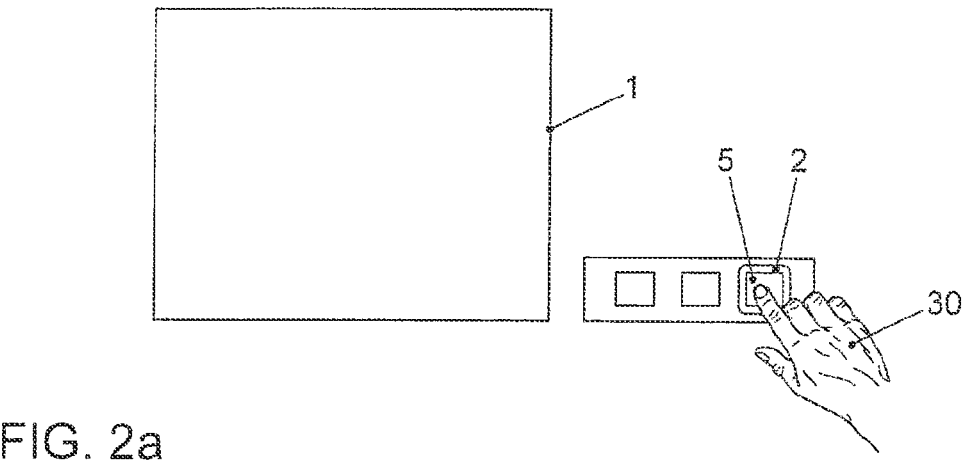
FIGS. 2a-2c illustrate operator actions for modifying the operation of an electrical consumer in a vehicle having associated displays, as they have been produced according to the method of an example embodiment of the present invention.

In FIG. 2*a*, a user operates operator element 5 using a hand in order to modify the operation of climate-control system 8. His intention is, for example, to activate the fixedly assigned function of air recirculation in the vehicle via operator element 5. Depending on the situation, however, functions displayed on display area 1 (not shown) are assignable to operator element 5. The operator action causes a change in the energy consumption of climate-control system 8.

The change in energy consumption expected upon completion of the operator action is already determined during the operator action, before the actual function is activated, and the resulting expected change in travel range is calculated. Just by lightly touching operator element 5, for example, a signal is already transmitted to control unit 3, which detects the operating state that would be newly set following completion of the operator action, and which estimates the energy consumption based on the consumption characteristic stored in data base 4. The consumption characteristic may be derived from data obtained in the past, the manufacturer's specification, or from values derivable therefrom. The expected change in travel range is displayed directly, in that illumination device 2 assigned to operator element 5 provides the user with visual feedback in connection with his or her operator action, by control unit 3. As illustrated in FIG. 2*b*, for example, illumination device 2 generates a red flashing light whose intensity is proportional to the relative change in travel range. This gives the user a valuable reference for aborting the operator action, or for canceling it immediately, as the case may be, in the event that the attendant change in the operation of climate-control system 8 would reduce the remaining travel range to an unreasonable extent.

The change in travel range may be represented in absolute and/or relative terms. Control unit 3 records, for instance, the charge state of vehicle battery 11 for a detected operator action, uses it to calculate the absolute or relative change in travel range together with the change in energy consumption, and displays it. As an alternative, the charge state is also able to be detected periodically, e.g., every minute, and the current charge state may be extrapolated from the most recently detected charge state(s) of the vehicle battery as soon as an operator action is newly detected.

Figure 2B:
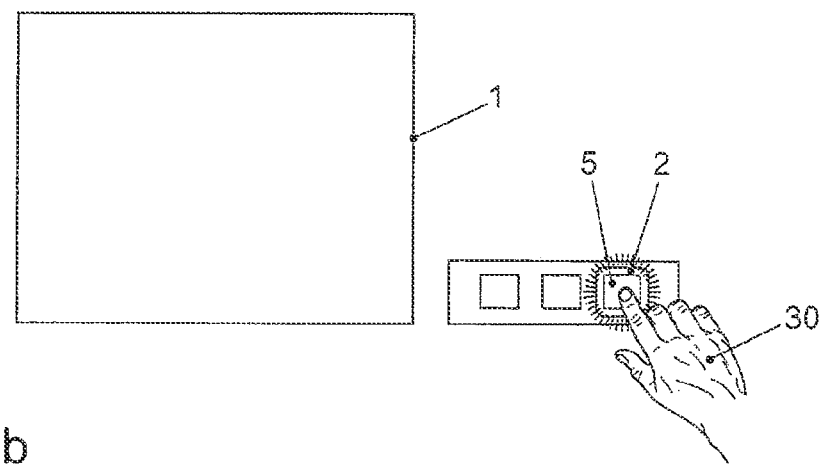
Figure 2C:
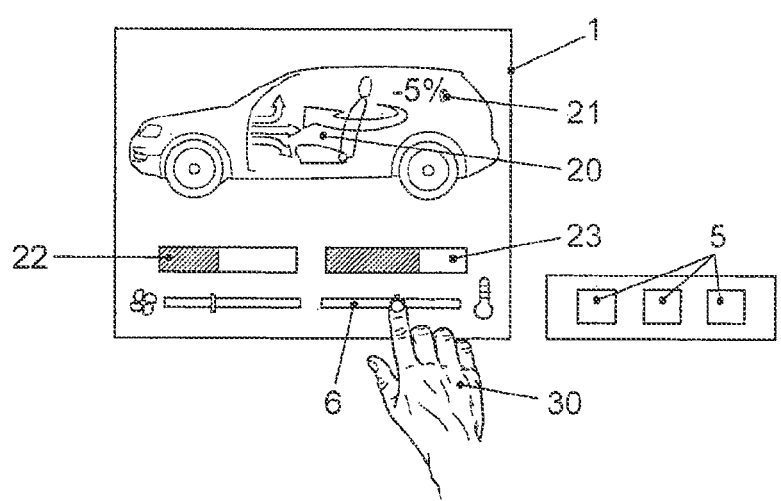

If the user then has completed the operator action, the associated change in range is directly displayed to the user in graphical form on display area 1, as shown in FIG. 2*c*. In the case of a graphical representation 20 of the set functions of climate-control system 8, a numerical representation 21 of the change in travel range is provided, which may optionally be represented either in absolute terms, e.g., "−10 km", or in relative terms, e.g., "−5%". Additional information with regard to energy consumption and remaining travel range may be visualized on display fields 22, 23. For instance, the relative reduction in range could be displayed on display field 22, and the change in energy consumption resulting from the operator action could be shown on display field 23.

In the case of an incremental change, e.g., a stepless temperature setting, it would be beneficial to display the incremental change in travel range caused by the most recently performed operator action in one of the two display fields, e.g., in left display field 22, and the cumulative change in travel range in the other display field 23. As also shown in FIG. 2*c*, following the implemented graphical display on display area 1, the user executes another such operator action using the index finger of his hand 30, by sliding his finger horizontally across a control button 6, implemented as slide control, on the touch-sensitive surface of display area 1, and the change in the remaining travel range is directly displayed to the user on display field 23 situated above.

In addition, if the energy consumption of an electrical consumer 8, 9 changes dramatically without any operator action, this will be indicated to the driver as well. For instance, it is visually signaled to the driver in the aforementioned manner if a sensor-controlled climate-control system automatically adjusts individual climate-control functions to a higher setting during a hot summer day, provided the absolute or relative change in travel range caused thereby exceeds a previously set limit value.

Figure 3:
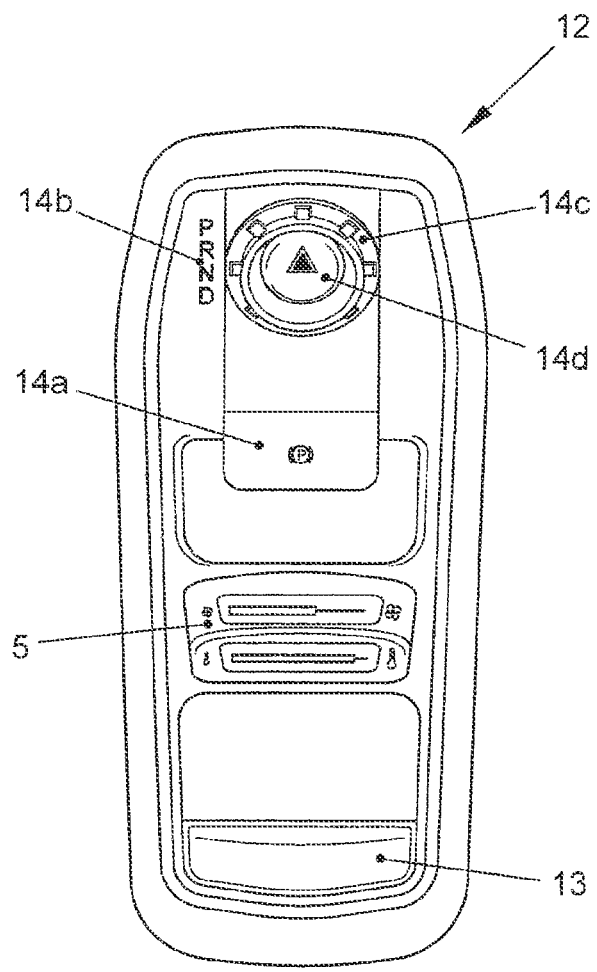
FIG. 3 shows an operator element for executing the operator actions of the method of an example embodiment of the present invention.

The operator actions illustrated in the exemplary embodiment with reference to FIGS. 2*a*-2*c*, are alternatively or additionally able to be executed in an especially comfortable manner via an operator element 12 situated in the center console of the vehicle, as shown in FIG. 3. In particular, the settings of the ventilator stage and the internal temperature are executable via operator elements 5, which are arranged as capacitive, so-called "slider" operator elements, here. In a, e.g., conventional manner, they include, for instance, two planes of conductive strips. The strips are fixed in place orthogonally and are insulated from each other.

One plane acts as sensor, the other plane assumes the task of the driver. If a finger is at the intersection of two strips, then the capacitance of the capacitor will change, and a signal is transmitted to the receiver strip. By sliding his finger in the horizontal direction, the driver of the vehicle is therefore able to operate climate-control system 8 in an especially comfortable manner.

Operator element 12 has a hand rest 13 at the lower edge for supporting the hand used for the operation. For practical purposes, additional user interface elements 14*a*-14*d* are disposed in operator element 12, via which the driver is able to operate additional vehicle functions. These include, for instance, a push-button switch 14*a* for an electro-mechanical parking brake, a gear-selector display 14*b*, a gear-selector rotary switch 14*c*, and a hazard light pushbutton switch 14*d*.

List of Reference Numerals
1 Display surface
2 Illumination device
3 Control unit
4 Database
5 Operator element
6 Control button
7 Data bus in the vehicle
8 Climate-control system
9 Additional electrical consumers
10 Device for detecting the energy consumption
11 Vehicle battery
12 Operator element
13 Hand rest
14*a*-14*d* Additional user interface elements
20 Graphical display of an electrical consumer
21 Numerical representation of the change in travel range
22 Display field
23 Additional display field
30 User hand

What is claimed is:

1. A method for operating a user interface in a vehicle, comprising:
   detecting an operator action, by which an operation of an electrical consumer arranged in the vehicle is modified;
   determining a change in energy consumption of the electrical consumer caused by the operator action;
   calculating a change in a travel range of the vehicle caused by the modified operation of the electrical consumer from the determined energy consumption; and
   directly displaying the calculated change in travel range;
   wherein the displaying includes displaying the change in travel range on the operator element via which the operator action is detected.

2. The method according to claim 1, wherein the displaying includes graphically displaying the change in travel range on a display area in the vehicle.

3. The method according to claim 1, wherein the change in travel range to be expected upon completion of the operator action is calculated and displayed during the operator action by which the operation of the electrical consumer arranged in the vehicle is to be modified.

4. The method according to claim 1, wherein the vehicle is arranged as a vehicle driven by an electric motor.

5. The method according to claim 1, wherein the electrical consumer includes a climate-control system for an interior of the vehicle.

6. The method according to claim 5, wherein at least one of (a) adjusted climate-control functions or (b) climate-control functions modified by the operator action are graphically displayed on a display area of the vehicle together with associated changes in travel range.

7. A device for operating a user interface in a vehicle, comprising:
   a device adapted to determine an energy consumption of an electrical consumer arranged in the vehicle;
   an operator element adapted to modify an operation of the electrical consumer by an operator action;
   a display device adapted to display information; and
   a control unit, which is coupled to the device adapted to determine the energy consumption and to the display device, the control unit adapted to control the display device and to calculate a change in travel range of the vehicle based on the determined energy consumption;
   wherein the control unit is adapted to control the display device to directly display a change in travel range expected at least one of (a) during or (b) after completion of the operator action as a result of the operator action; and
   wherein the control unit is adapted to directly display the change in travel range on the operator element via which the operator action is detected.

8. The device according to claim 7, wherein the display device includes an illumination device controllable with regard to at least one of (a) light intensity or (b) color, and adapted to at least one of (a) light or (b) backlight at least one of (a) the operator element or (b) a display area adapted to display the change in travel range.

9. A vehicle, comprising:
   a device adapted to operate a user interface in the vehicle, comprising:
      a device adapted to determine an energy consumption of an electrical consumer arranged in the vehicle;
      an operator element adapted to modify an operation of the electrical consumer by an operator action;
      a display device adapted to display information; and
      a control unit, which is coupled to the device adapted to determine the energy consumption and to the display device, the control unit adapted to control the display device and to calculate a change in travel range of the vehicle based on the determined energy consumption;
      wherein the control unit is adapted to control the display device to directly display a change in travel range expected at least one of (a) during or (b) after completion of the operator action as a result of the operator action; and wherein the control unit is adapted to directly display the change in travel range on the operator element via which the operator action is detected.

* * * * *